United States Patent
Stühler et al.

(10) Patent No.: US 6,180,271 B1
(45) Date of Patent: Jan. 30, 2001

(54) METHOD FOR OPERATING A PEM FUEL CELL PLANT AND PEM FUEL CELL PLANT

(75) Inventors: Walter Stühler, Hirschaid; Herbert Stenger, Burgthann; Martin Keim, Möhrendorf, all of (DE)

(73) Assignee: Siemens Aktiengesellschaft, Munich (DE)

(*) Notice: Under 35 U.S.C. 154(b), the term of this patent shall be extended for 0 days.

(21) Appl. No.: 09/356,399

(22) Filed: Jul. 16, 1999

Related U.S. Application Data

(63) Continuation of application No. PCT/DE98/00037, filed on Jan. 7, 1998.

(30) Foreign Application Priority Data

Jan. 16, 1997 (DE) .............................................. 197 01 390

(51) Int. Cl.⁷ .................................................. H01M 8/04
(52) U.S. Cl. .................................................. 429/13; 429/23
(58) Field of Search ........................................ 429/13, 23

(56) References Cited

U.S. PATENT DOCUMENTS

| | | | |
|---|---|---|---|
| 5,290,641 | * 3/1994 | Harashima | 429/17 |
| 5,432,020 | * 7/1995 | Fleck | 429/13 |
| 5,434,016 | * 7/1995 | Benz et al. | 429/13 |
| 5,645,950 | 7/1997 | Benz et al. | 429/13 |
| 5,780,981 | * 7/1998 | Sonntag et al. | 429/23 X |
| 5,877,600 | * 3/1999 | Sonntag | 429/23 X |

FOREIGN PATENT DOCUMENTS

| | | |
|---|---|---|
| 43 22 765 C1 | 6/1994 | (DE) . |
| 43 18 818 A1 | 12/1994 | (DE) . |
| 195 26 774 A1 | 1/1997 | (DE) . |
| 195 40 824 A1 | 5/1997 | (DE) . |
| 195 40 829 A1 | 5/1997 | (DE) . |
| 195 41 575 A1 | 5/1997 | (DE) . |
| 196 40 808 C1 | 11/1997 | (DE) . |
| 0 633 157 A1 | 1/1995 | (EP) . |

OTHER PUBLICATIONS

International Publication No. WO 98/15022 (Stühler et al.), dated Apr. 9, 1998.

"Fuel Cell Dynamics in Transit Applicants" (Swan et al.), Anaheim, Dec. 5–7, 1994, vol. 1, Symposium No. 12, 1994, pp. 73–80.

* cited by examiner

Primary Examiner—Stephen Kalafut
(74) Attorney, Agent, or Firm—Herbert L. Lerner; Laurence A. Greenberg; Werner H. Stemer

(57) ABSTRACT

A method is provided for operating a PEM fuel cell plant containing at least one PEM fuel cell block and a speed-controlled compressor upstream of the PEM fuel cell block for supplying air at a volume flow rate. The speed of the compressor is controlled to a desired value for adjusting the electric current of the PEM fuel cell block to a given value. The desired value is derived from the given value of the electric current. This measure ensures a simple control of the air volume flow rate for the PEM fuel cell block with low apparatus requirements. A PEM fuel cell plant is also provided.

7 Claims, 1 Drawing Sheet

METHOD FOR OPERATING A PEM FUEL CELL PLANT AND PEM FUEL CELL PLANT

CROSS-REFERENCE TO RELATED APPLICATION

This application is a continuation of copending International Application No. PCT/DE98/00037, filed Jan. 7, 1998, which designated the United States.

BACKGROUND OF THE INVENTION

Field of the Invention

The invention relates to a method for operating a PEM fuel cell plant, and a PEM fuel cell plant.

Fuel cells enable electrical energy to be generated directly from hydrogen ($H_2$) and oxygen ($O_2$) with considerably greater efficiency and significantly lower pollutant emission than conventional measures for generating energy. In addition they operate almost silently.

In addition to those basic advantages, the fuel cell with a solid electrolyte of synthetic material (Polymer Electrolyte Membrane or PEM) has further positive features such as a lower operating temperature below 80° C., favorable overload behavior, low voltage degradation, long service life, favorable load and temperature cycle characteristics and the absence of a liquid, corrosive electrolyte. Furthermore, it can be used for operation with air from the surroundings instead of with oxygen ($O_2$).

As a result of all of those characteristics, the PEM fuel cell which is operable with air is an almost ideal generator of electrical power, e.g. for the operation of a power-driven vehicle emitting no exhaust gases.

PEM fuel cells cannot be operated in isolation. For that reason a PEM fuel cell block including many PEM fuel cells, an operating part and an associated electronic module are combined together to form a PEM fuel cell module. The operating part contains devices for supplying hydrogen ($H_2$) and air, for leading away water which is produced, for dissipation of heat losses, for wetting the reactants and for the separation of gas impurities.

Important parameters which characterize the operation with air of a PEM fuel cell plant (with at least one PEM fuel cell module) are the air ratio $\lambda$ and the air volume flow rate $V_L$. The air volume flow rate $V_L$ is a measure of the quantity of air flowing through the PEM fuel cell block per unit time. The air ratio $\lambda$ indicates the amount of air required by the reaction if air from the surroundings is used instead of pure oxygen ($O_2$).

The control or regulation of the air volume flow rate $V_L$ for a PEM fuel cell plant is complicated. For example, an air supply device for an air-driven fuel cell plant with a compressor is known from German Published, Non-Prosecuted Patent Application DE 43 18 818 A1, corresponding to U.S. Pat. Nos. 5,432,020; 5,434,016; and 5,645,950. In order to adjust the compressor, the air volume flow rate $V_L$ and the electric current I of a PEM fuel cell block are recorded continuously with a flowmeter and an actual current sensor, respectively. Both the air volume flow rate $V_L$ and the electric current I of the PEM fuel cell block are continuously transmitted to a control device. Thus, several parameters are continuously recorded and processed in order to adjust the compressor and therewith the PEM fuel cell block.

SUMMARY OF THE INVENTION

It is accordingly an object of the invention to provide a method for operating a PEM fuel cell plant with a PEM fuel cell block as well as such a PEM fuel cell plant, which overcome the hereinafore-mentioned disadvantages of the heretofore-known methods and devices of this general type and which ensure a simple adjustment of an air volume flow rate $V_L$ for the PEM fuel cell block, with low apparatus requirements and thus at a more reasonable cost than the method known from the state of the art.

With the foregoing and other objects in view there is provided, in accordance with the invention, a method for operating a PEM fuel cell plant having at least one PEM fuel cell block and a speed-controlled compressor disposed upstream of the at least one PEM fuel cell block for supplying air at a volume flow rate $V_L$, which comprises controlling a speed n of the compressor to a desired value $n_{SN}$ for adjusting an electric current I of the at least one PEM fuel cell block to a given value $I_{SN}$; deriving the desired value $n_{SN}$ from the given value $I_{SN}$ of the electric current I according to a characteristic curve $n=f(I_{SN})$; and simultaneously adjusting the desired value $n_{SN}$ of the speed to a value according to the characteristic curve when the given value $I_{SN}$ changes.

This method ensures a control with a simple apparatus of the speed n of the speed-controlled compressor and thus of the air volume flow rate $V_L$ for the PEM fuel cell block. This control does not involve measurement, either of the air volume flow rate $V_L$ through the PEM fuel cell block or of the electric current of the PEM fuel cell block.

For a given value $I_{SN}$ of the electric current I of the PEM fuel cell block, the corresponding desired value $n_{SN}$ for the speed n of the speed-controlled compressor is derived from a predefined characteristic curve for the given air ratio $\lambda$. The desired value $n_{SN}$ is then applied to the speed-controlled compressor. Thus a controller for the speed-controlled compressor is not needed. The method is therefore less costly than the method known from the state of the art. In addition, this method is also very dynamic during changes of load.

In accordance with another mode of the invention, the desired value $n_{SN}$ of the speed n for the speed-controlled compressor is determined by a control unit.

In particular, the given value $I_{SN}$ of the electric current I for a load can be determined by the control unit.

In accordance with a further mode of the invention, a valve downstream of the PEM fuel cell block is adjusted in such a way that at a maximum speed $n_M$ of the compressor, air is delivered at a volume flow rate $V_L$ which corresponds to the given air ratio $\lambda$. This measure creates optimized operating conditions for the PEM fuel cell plant such as, for example, a suitable operating pressure of operating material in the PEM fuel cell block or maintenance of a constant air ratio $\lambda$ during changes in the electric current I of the PEM fuel cell block through control of the speed n of the compressor.

With the objects of the invention in view, there is also provided a PEM fuel cell plant, comprising at least one PEM fuel cell block; a speed-controlled compressor disposed upstream of the at least one PEM fuel cell block for supplying air at a volume flow rate $V_L$; and a control unit for adjusting an electric current I of the at least one PEM fuel cell block to a given value $I_{SN}$, the control unit connected to the compressor for controlling the speed n of the compressor to a desired value $n_{SN}$ derived from the given value $I_{SN}$ of the electric current I.

In accordance with another feature of the invention, there is provided a valve disposed downstream of the at least one PEM fuel cell block.

In accordance with a concomitant feature of the invention, the control unit includes a gas pedal for adjusting the electric current of the at least one PEM fuel cell block.

Other features which are considered as characteristic for the invention are set forth in the appended claims.

Although the invention is illustrated and described herein as embodied in a method for operating a PEM fuel cell plant and a PEM fuel cell plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
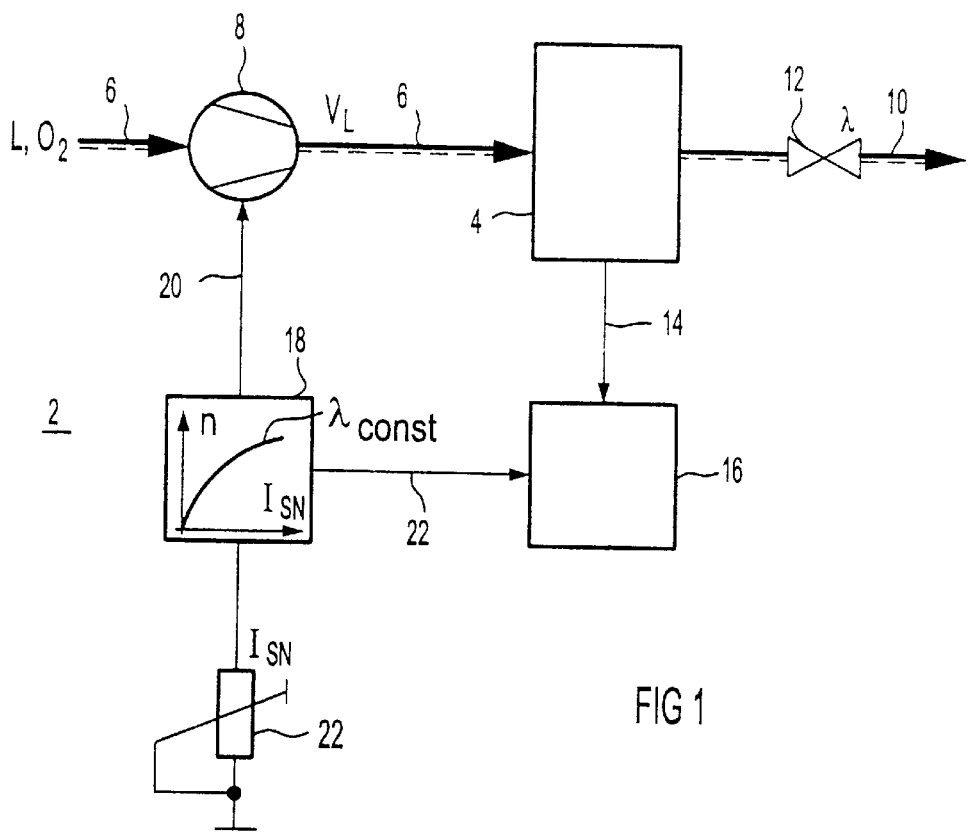
FIG. 1 is a schematic and block diagram representing a PEM fuel cell plant according to the invention.

Referring now to the figures of the drawings in detail and first, particularly, to FIG. 1 thereof, there is seen a PEM fuel cell plant 2 which contains a PEM fuel cell block 4 formed of a combination of a plurality of PEM fuel cells. For example, the PEM fuel cell plant 2 may be part of an electrically powered vehicle, such as a power-driven passenger vehicle, a bus, or a fork-lift truck.

The operating materials used for operating the PEM fuel cell plant 2 are hydrogen $H_2$ and air L from the surroundings.

The air L is fed along a feed path 6 into the PEM fuel cell block 4 for electrochemical reaction within the PEM fuel cell block 4. A compressor 8, which can be adjusted through its speed, is provided in the feed path 6 upstream of the PEM fuel cell block 4, in order to feed the air L at a volume flow rate $V_L$ to the PEM fuel cell block 4.

The air which is not used in the electrochemical reaction inside the PEM fuel cell block 4 is led away from the same through an outlet path 10. A valve 12 is provided in the outlet path 10 downstream of the PEM fuel cell block 4. This valve 12 in the outlet path 10 is adjusted in such a way that at a maximum speed $n_M$ of the speed-controlled compressor 8 the air volume flow rate $V_L$ which is generated through the PEM fuel cell block corresponds to a given air ratio $\lambda$, for example $\lambda=2$. Thus the adjustment of the valve 12 determines the value of the air ratio $\lambda$ for operation of the PEM fuel cell block 2.

An electric current I which is generated through the electrochemical reaction in the PEM fuel cell block 4 is fed into a load 16 over an electrical conductor 14. The load 16 can, for example, be an electric motor of an electrically powered vehicle.

A value $I_{SN}$ of the electric current I of the PEM fuel cell block 4 is determined with a control unit 18, 22. The control unit 18, 22 includes a gas pedal 22 of an electrically driven vehicle. Different positions of the gas pedal 22 correspond to different values $I_{SN}$ of the electric current I of the PEM fuel cell block 4.

In this method for adjusting the electric current I of the PEM fuel cell block 4 to the given value $I_{SN}$ a speed n of the compressor 8 is adjusted to a desired value $n_{SN}$, wherein the desired value $n_{SN}$ is derived from the given value $I_{SN}$ of the electric current I. To this end the desired value $n_{SN}$ of the speed n obtained from the control unit 18, 22 is applied over a conductor 20 to the compressor 8, which is adjustable through its speed n.

This method therefore does not require any regulation of the speed-controlled compressor 8 and therewith the air volume flow rate $V_L$. A flowmeter for measuring the air volume flow rate $V_L$ and an actual current value sensor for recording the electric current I of the PEM fuel cell block 4, can also be dispensed with. Thus the construction of the apparatus for this control system is decisively simplified in comparison with the PEM fuel cell plants known from the state of the art. In addition, a high dynamism is ensured during changes in load.

In this method the desired value $n_{SN}$ is derived from the given value $I_{SN}$ in dependence on the given air ratio $\lambda$. To this end a characteristic curve for the functional connection between the electric current I of the PEM fuel cell block 4 and the speed n of the speed-controlled compressor 8 is provided for the control unit 18, 22 for the given air ratio $\lambda$, preferably $\lambda=2$. It is thus possible through the use of this characteristic curve to directly determine the desired value $n_{SN}$ of the speed n for the speed-controlled compressor 8 corresponding to the given value $I_{SN}$ of the electric current I. The compressor 8, which is then controlled by the desired value $n_{SN}$, supplies the PEM fuel cell block 4 with air at the volume flow rate $V_L$ that is necessary for generating the given value $I_{SN}$ of the electric current I.

Figure 2:
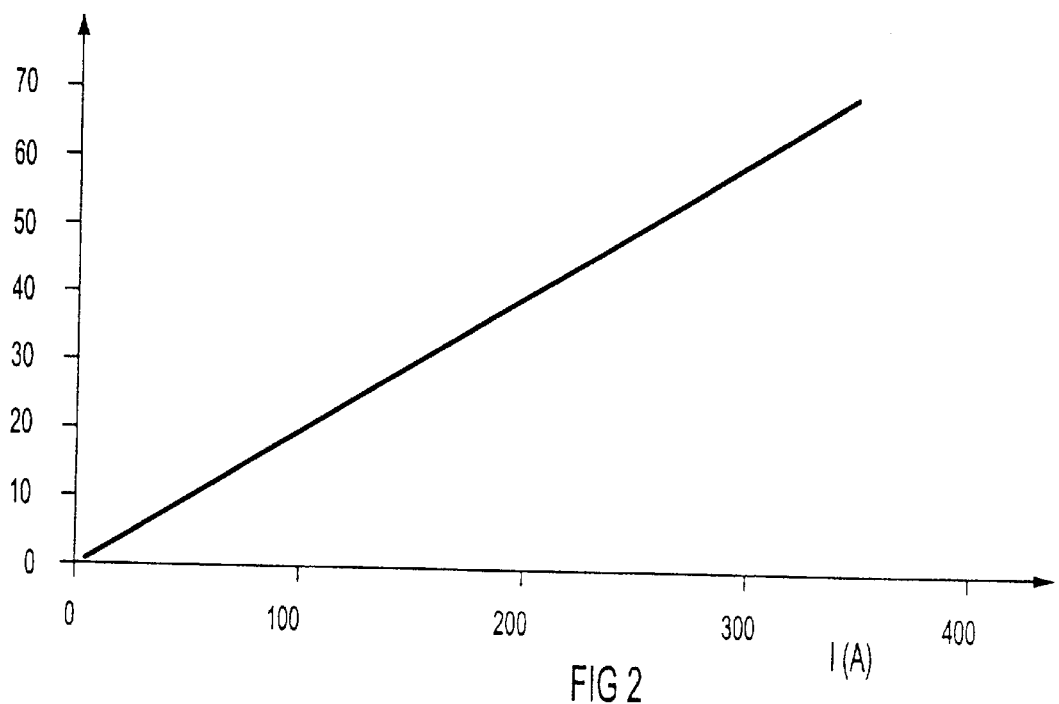
FIG. 2 is a diagram in which an air volume flow rate $V_L$ through a PEM fuel cell block is plotted against an electric current I generated in the PEM fuel cell block for a given air ratio $\lambda$.

In a diagram shown in FIG. 2, the air volume flow rate $V_L$ of the PEM fuel cell block 4 is plotted against the electric current I generated in the PEM fuel cell block 4 for a given air ratio $\lambda$.

According to Faraday's Law, the air volume flow rate $V_L$ and the electric current I of the PEM fuel cell block are related by the following function:

$$V_L = \lambda * \frac{0.2091 * I * n_B}{0.21} * \frac{T_L}{}, \text{ wherein:}$$

$V_L$ is the air volume flow rate through the PEM fuel cell block 4 in kg/h;

$\lambda$ is the air ratio;

$0.2091*I*n_B$ is the volume flow rate through the PEM fuel cell block 4 of oxygen ($O_2$) in kg/h calculated according to Faraday's Law;

I is the electric current in A (amps) generated in the PEM fuel cell block 4;

$n_B$ is the number of PEM fuel cells in the PEM fuel cell block 4;

0.21 is the volumetric fraction of oxygen ($O_2$) in the air; and $T_L$ is the temperature in K (Kelvin) of the air flowing through the PEM fuel cell block 4.

Thus, every value of I for the electric current generated in the PEM fuel cell block corresponds to a specific value $V_L$ of the air volume flow rate through the PEM fuel cell block 4 that is necessary for generation of the electric current I.

If a constant empirical value is given for the air ratio $\lambda$, preferably 2, a linear relationship is obtained between the air volume flow rate $V_L$ and the electric current of the PEM fuel cell block 4, since all of the other parameters in Faraday's Law are constants which do not need to be measured separately.

Since, in addition, the speed n of the speed-controlled compressor 8 is proportional to the air volume flow rate $V_L$ which it generates, there is a linear relationship between the speed n of the speed-controlled compressor 8 and the electric current I of the PEM fuel cell block 4.

Thus, the desired value $n_{SN}$ for a given value $I_{SN}$ of the electric current I can be derived in a simple way through the use of the characteristic curve for the functional relationship between the electric current I of the PEM fuel cell block 4 and the speed n of the speed-controlled compressor 8.

We claim:

1. In a method for operating a PEM fuel cell plant having at least one PEM fuel cell block and a speed-controlled compressor disposed upstream of the at least one PEM fuel cell block for supplying air at a volume flow rate, the improvement which comprises:

defining a relationship between a speed of the compressor and an electric current of the at least one PEM fuel cell block;

inputting a value for the electric current and instantaneously adjusting the speed of the compressor to a value corresponding to the electric current according to the relationship between the speed and the electric current.

2. The method according to claim 1, which comprises determining the speed for the speed-controlled compressor with a control unit.

3. The method according to claim 1, which comprises adjusting a valve disposed downstream of the at least one PEM fuel cell block for generating an air volume flow rate corresponding to a given air ratio at a maximum speed of the compressor.

4. The method according to claim 1, which comprises defining the relationship according to a characteristic curve $n=f(I_{SN})$, where n is the speed of the compressor and $I_{SN}$ is the value of the current.

5. A PEM fuel cell plant, comprising:

at least one PEM fuel cell block;

a speed-controlled compressor disposed upstream of said at least one PEM fuel cell block for supplying air at a volume flow rate; and a control unit connected to said compressor for controlling a speed of said compressor;

said control unit having an input receiving an input signal representing a value for the electric current and being programmed:

to define a direct relationship between the speed of the compressor and an electric current of the at least one PEM fuel cell block; and to instantaneously adjust the speed of the compressor to a value corresponding to the electric current according to the defined relationship between the speed and the electric current upon receiving a changed input signal.

6. The PEM fuel cell plant according to claim 5, including a valve disposed downstream of said at least one PEM fuel cell block relative to an air flow.

7. The PEM fuel cell block according to claim 5, wherein said control unit includes a gas pedal for adjusting the electric current of said at least one PEM fuel cell block.

* * * * *